United States Patent [19]

Argyll

[11] 4,276,915
[45] Jul. 7, 1981

[54] SLUDGE SEPARATION PLANT

[76] Inventor: Marion H. Argyll, 15 E. Irving St., Chevy Chase, Md. 20015

[21] Appl. No.: 114,834

[22] Filed: Jan. 24, 1980

[51] Int. Cl.³ ............................................. B65B 3/04
[52] U.S. Cl. .................................... 141/98; 141/100; 414/573
[58] Field of Search ...................... 141/1, 11, 98, 286, 141/324, 392, 100; 198/601, 611; 209/12; 241/24, 25; 414/355, 573, 574, 268

[56] References Cited

U.S. PATENT DOCUMENTS 4,072,273   2/1978   Reiniger ................................. 241/24

Primary Examiner—Frederick R. Schmidt
Attorney, Agent, or Firm—Wilkinson, Mawhinney & Theibault

[57] ABSTRACT

A sludge distribution plant which receives a plurality of trucks either simultaneously or singly which bring in dried sludge in granular form and effluent both of which are separated between origin pickup and the distribution plant as shown in U.S. Pat. 4,046,689. At the plant site there are means for discharging the dry granular material containing debris into a sieve type shaker arranged over a conveyor belt both of which are on an angle of delination from the truck toward a central collector and conveyor system positioned to receive the non-liquid discharge contents of a plurality of trucks and which will separate the dry granular material from the debris and discharge each separately. There is means at each truck discharge area for discharging the concentrated effluent from each vehicle and storing same in underground tanks for further processing into urea fertilizer, bin storage means is positioned to receive the dried granular material and bin storing it until it is further processed for conversion into fertilizer, and bagging and storing means for the granular material is in communication with the bin storage means. Conveyor means are positioned to convey said granular material in said bin storage means to said bagging and storage means.

1 Claim, 4 Drawing Figures

U.S. Patent Jul. 7, 1981 Sheet 1 of 2 4,276,915
FIG. 1
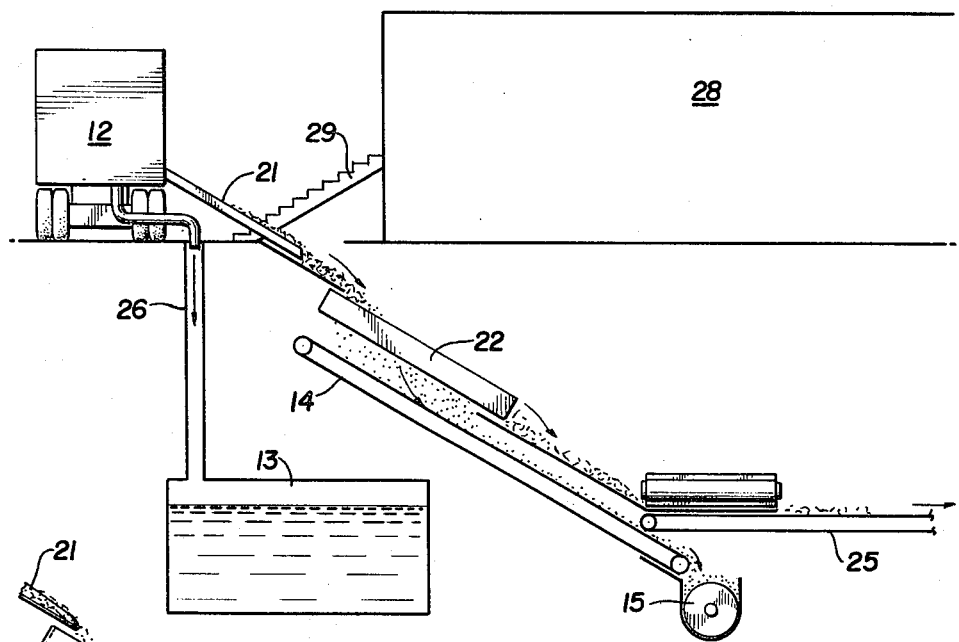
FIG. 4
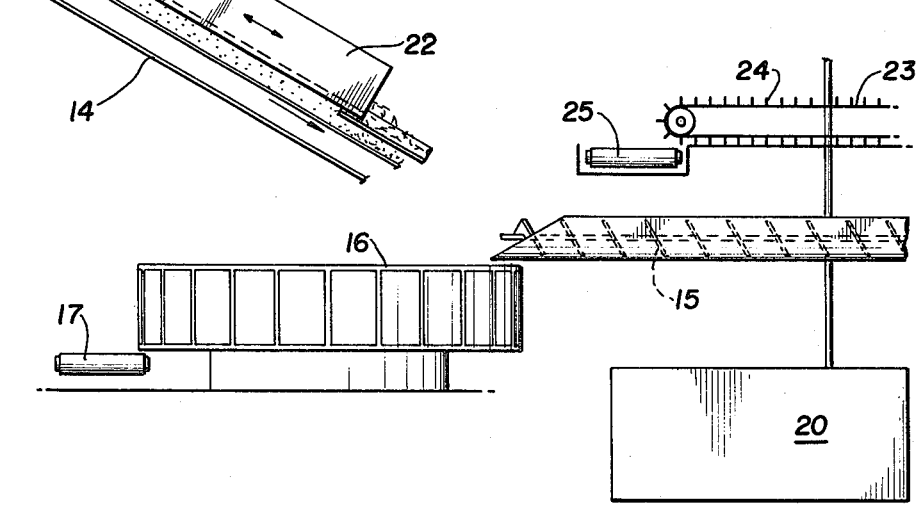
FIG. 3

SLUDGE SEPARATION PLANT

TECHNICAL FIELD

My invention relates to a plant for simultaneously handling a plurality of trucks of the type shown in my prior U.S. Pat. No. 4,046,689, granted Sept. 6, 1977, when they have their contents processed for discharge and separating dried granular and debris from each other and effluent liquid from both. The dried granular material is stored in bins until it can be bagged and used as fertilizer. The liquid effluent is stored in underground tanks until it can be further processed into a urea fertilizer.

BACKGROUND ART

Heretofore trucks have transported sludge to a processing plant in a liquid or semi-solid stage such as shown in U.S. Pat. No. 3,807,566 and U.S. Pat. No. 1,979,647 as well as U.S. Pat. No. 3,807,566 which require a long period of time to process and take up valuable holding area during treatment.

The use of plural stations circumferentially arranged to be supplied from a single central supply conveyor is shown in U.S. Pat. No. 2,563,583.

I am aware of no prior art in which the sludge is loaded into a truck in a liquid semi-solid state with debris intermixed therewith and transported to a plant for final processing which at the time of arrival of the sludge at the processing plant it has been converted from a liquid or semi-solid state to a dry granular state.

The best prior art known to me at the time of filing this application are the following U.S. Pat. Nos. 586,510; 978,381; 1,417,205; 1,979,647; 2,563,583; 3,807,566.

DISCLOSURE OF THE INVENTION

In accordance with my invention I provide a sludge handling and distribution plant which provides a plurality of truck receiving areas which will receive and separate in storage areas the dry granular material separate from debris as well as liquid effluent brought to the plant by trucks constructed in accordance with my prior U.S. Pat. No. 4,046,689, until it is either further processed by addition of chemicals or directly bagged and sold as fertilizer.

The plant according to my invention is set up to handle a large number of trucks and does not require processing of the delivered material which will give off objectionable odors in the community. The debris is separated from the dry granular material mechanically and is disposed of separately while the granular material is stored in bins until bagged and sold while the liquid effluent is stored in underground tanks until it is either sold in bulk or has chemicals added for sale as urea fertilizer.

BRIEF DESCRIPTION OF THE DRAWINGS

FIG. 1 is a schematic top plan view of a plant constructed in accordance with my invention;

FIG. 3 is a fragmentary vertical sectional view taken along the major axis of the plant;

FIG. 4 is a side elevational view of the granular material and debris separation device.

THE BEST MODE FOR CARRYING OUT THE INVENTION

Figure 2:
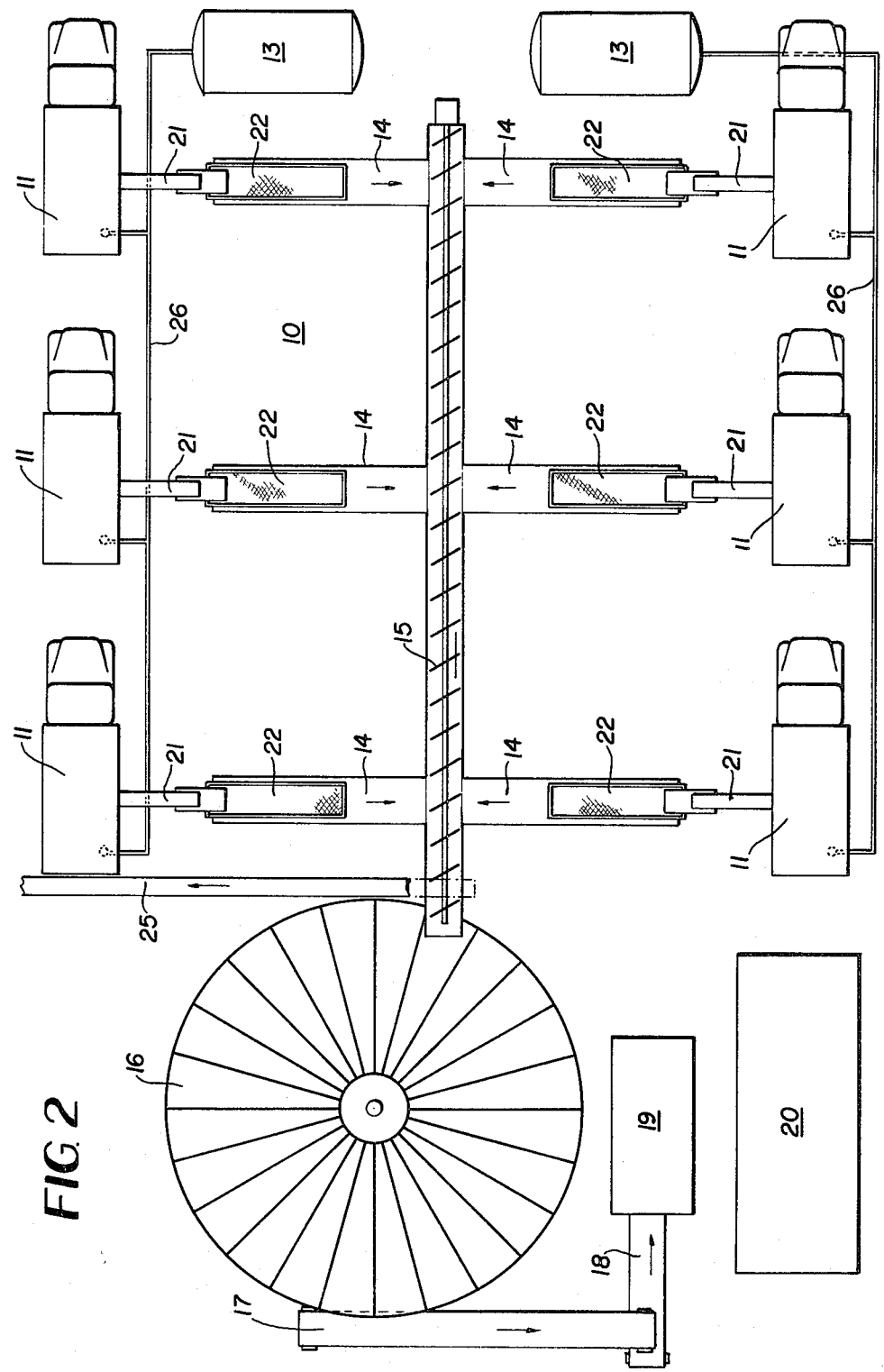
FIG. 2 is a schematic vertical section through one-half of a plant.

Referring now to FIGS. 1 and 2, 10 designates a building housing a plant according to my invention within which are truck discharge sites 11 each adapted to receive a truck 12 according to my prior U.S. Pat. No. 4,046,689 which has completed its run from a sludge or sewage supply source and arrives at the plant discharge site 11 with dried granular material in one compartment and liquid effluent in a tank.

As seen in FIG. 2, the area between rows of truck discharge sites is recessed to accommodate storage tanks 13 for the liquid effluent. Truck site conveyors 14 are provided at each truck site which discharge into a central screw conveyor 15 which runs parallel to the truck sites and which conveys the dry granular material to the storage bin area 16 where the dry granular material is held until it is transferred by conveyors 17, 18 to a bagging station 19, thence to a storage area 20 to await shipping.

At each truck discharge station 11 there is provided a chute 21 down which the dried granular material having debris intermixed therewith. At the end of each chute 21 is a sieve or screen shaker trough 22 which is vibrated and shaken which with the aid of gravity due to its downward declination will advance the debris along the shaker trough to a debris central conveyor which is of the endless belt type 23 having flights 24 which will move the debris along the line of truck discharge sites to a second debris conveyor 25 which will remove the debris out of the plant for disposal. The dry granular material passing through the screen shaker 22 falls upon the conveyor 14 and is discharged into the central conveyor 15.

At each truck discharge site is a standpipe 26 which is connected to the liquid effluent discharge on the effluent tank on each truck and which connects to a pipe system ending at liquid effluent underground storage tanks 13 where the effluent is stored until either containerized or mixed with additive chemicals and containerized for sale as a urea fertilizer.

The storage bin area 16 is as best seen in FIGS. 1 and 3 a circular array of bins mounted for rotation about a concrete base so they may be indexed to come into registry with conveyors 17, 18 to advance the dry granular material to the bagging station 19. The outer circumferential wall of each bin is provided with a gate for discharge of the bin contents onto the conveyor.

Positioned over the central conveyors and lying above the truck level are the business offices and control center for the plant 28 which are accessible by stairs 29.

What I claim is:

1. For use with a truck which converts sludge and effluent into a dry granular material forming a base for fertilizer and concentrated effluent in liquid form for making urea fertilizer, a sludge handling and distribution plant comprising:
    (a) means for receiving a plurality of truck bodies at a plurality of discharge areas;
    (b) means for discharging the dry granular material containing debris into a sieve type shaker arranged over a conveyor belt both of which are on an angle of declination from the truck toward a central collector and conveyor system positioned to receive the non-liquid discharge contents of a plurality of trucks and which will separate the dry granular material from the debris and discharge each separately, (c) means at each truck discharge area for discharging the concentrated liquid effluent from each vehicle and storing same in underground tanks for further processing into urea fertilizer;

(d) bin storage means positioned to receive the dried granular material from said central collector and conveyor system and bin storing it until it is further processed for conversion into fertilizer, and (e) bagging and storing means for said granular material, in communication with said bin storage means, (f) and conveyor means positioned to convey said granular material from said bin storage means to said bagging and storing means.

* * * * *